Patented Jan. 15, 1946

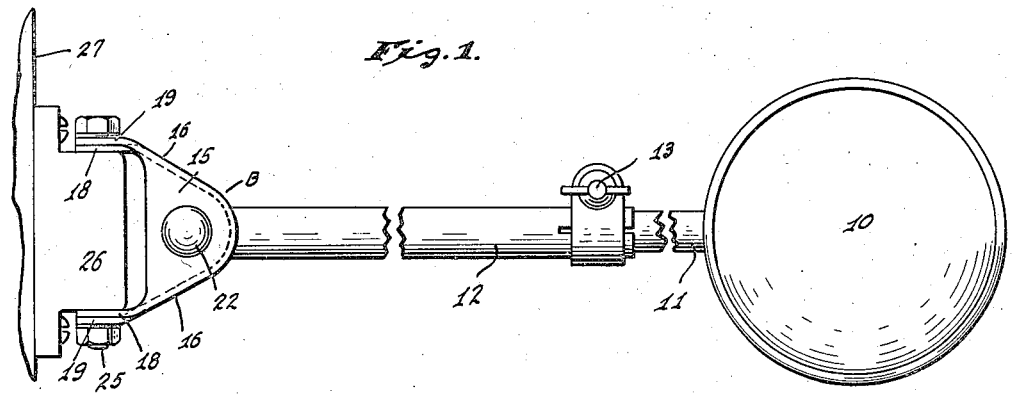
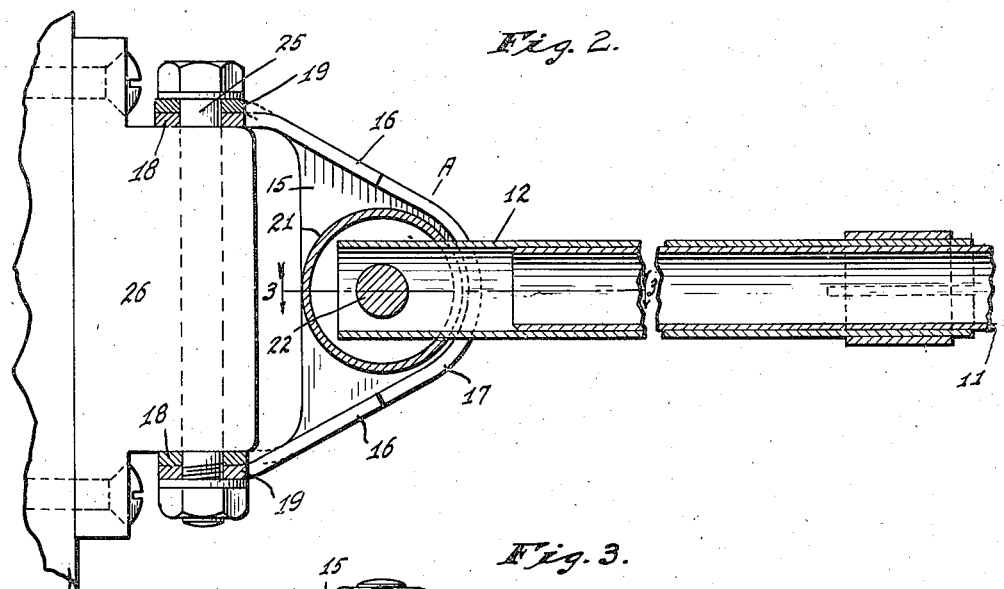
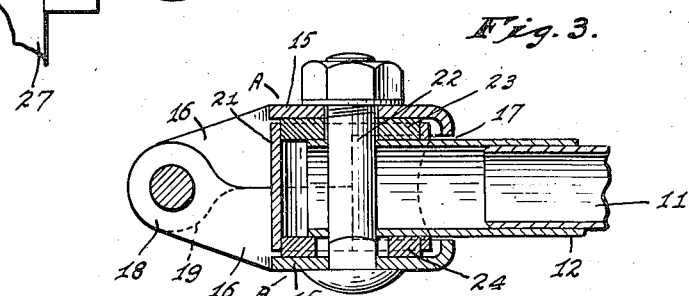
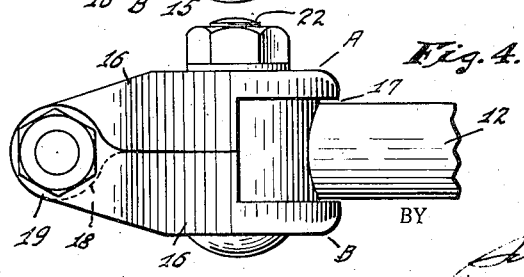
INVENTORS.
Quintin G. Noblitt and
Edmund Ludlow,
BY
ATTORNEYS.

2,393,056

UNITED STATES PATENT OFFICE 2,393,056

REAR-VIEW MIRROR MOUNTING

Quintin G. Noblitt and Edmund Ludlow, Columbus, Ind., assignors to Noblitt-Sparks Industries, Inc., Columbus, Ind., a corporation of Indiana Application June 30, 1944, Serial No. 542,842

6 Claims. (Cl. 248—226)

Our invention relates to rear-vision mirrors of the kind used most frequently in trucks or other large vehicles where the mirror is mounted on a relatively long adjustable arm at the side of the vehicle. It is our object to produce a mirror-mounting which can be simply and economically produced, which can be quickly adjusted to locate the mirror in any desired position, and which will effectively hold the mirror in such position.

In carrying out our invention, we mount the mirror at one end of an elongated arm, desirably tubular in cross-section. The other end of the arm is received in a transverse opening of a sleeve mounted between two sheet-metal stampings. A bolt extending through the stampings, axially through the sleeve, and transversely through the arm serves to prevent separation of the arm and sleeve and also to clamp the two stampings together to hold the sleeve and arm in any desired position of angular adjustment about the bolt-axis. The two stampings are so formed as to provide when assembled two spaced ears adapted to be adjustably secured by a common pivot bolt to a bracket mounted on the vehicle.

The accompanying drawing illustrates our invention: Fig. 1 is an elevation of the complete assembly of mirror and mounting; Fig. 2 is a view similar to Fig. 1 but on an enlarged scale showing some of the parts broken away to illustrate the construction more clearly; Fig. 3 is a horizontal section on the line 3—3 of Fig. 2; and Fig. 4 is a top plan view of the mounting.

In the construction illustrated in the drawing, the rear vision mirror 10 is mounted on the outer end of a tube 11 which is telescopically received within a second tube 12. The two tubes provide an extensible mirror-supporting arm which can be secured in any desired position of adjustment by a suitable clamp 13. Our invention is not concerned with any details of construction of the mirror-supporting arm 11—12 but rather with a universal mounting for the inner end of such arm.

The mounting shown in the drawing comprises a pair of generally similar sheet-metal stampings designated by the reference letters A and B in the drawing. Each of such stampings comprises a plane web 15 generally triangular in shape with a rounded apex. Extending around the apex of the web 15 and along the adjacent sides thereof is a flange 16 provided at the apex of the web with a notch 17. The flanges 16 continue beyond the base of the web 15 to form ears 18 and 19. The stampings are so shaped that when two of them are placed in opposed relation in the manner shown in the drawing, the ears of one stamping will overlap respectively the ears of the other, as will be clear from Figs. 3 and 4.

The inner end of the tube 12 is received in an opening in the wall of a sleeve 21 receivable between the webs 15 of the stampings A and B. Such webs together with the inner end of the tube 12 are provided with alined holes for the reception of a clamp bolt 22 which extends axially through the sleeve 21. Surrounding such bolt on opposite sides of the tube 12 are a pair of washers 23 and 24. The sleeve 21 and washers 23 and 24 form, in effect, a hub for the arm 11—12.

The overlapping ears 18 and 19 of the two stampings are provided with alined openings for the reception of a bolt 25 by which the two stampings A and B are jointly secured to a bracket 26 adapted to be attached in any convenient manner on a portion 27 of the vehicle.

In assembling the mounting, the tube 12 is first passed through the opening in the sleeve 21, the washers 23 and 24 are then placed in the ends of the sleeve, and the sleeve is brought between the two opposed stampings A and B and held in place by the bolt 22. The notches 17 in the flanges 16 provide in the assembly a slot having a considerable angular extent about the axis of the bolt 22 so as to permit angular adjustment of the mirror-supporting arm 11—12 about such axis.

The parts of the device are so dimensioned that a large part or all of the clamping effort exerted by the bolt 22 when tightened is transmitted from one stamping to the other through the washers 23 and 24 and the tube 12 rather than through the flanges 16 or the sleeve 21. Tightening of the bolt 22, therefore, by drawing the webs 15 of the respective stampings toward each other, forces the washers 23 and 24 against opposite sides of the tube 12, hence tending to reduce the tube-diameter coincident with the axis of the bolt 22 and to increase the tube-diameter normal to the bolt-axis. The resultant distortion of the tube tends to tighten it in the hole in the sleeve 21. Further tightening of the bolt increases the pressure between the washers 23 and 24 and the webs 15 which respectively engage them, thus cerating a friction-brake action opposing rotation of the arm 12—11 about the axis of the bolt 22.

In the preferred form of the device, the ears 18 and 19 on each stamping are not symmetrically arranged relative to the center-line of the web 15 but instead are offset in the same direction from symmetrical positions. Thus, as shown in the drawing, the distance of the ear 18 from the center-line of the web is less than the distance of the ear 19 from such center-line, and the difference in the distances is substantially equal to the thickness of each ear. As a result of this, when two stampings identical in form are placed in opposed relation, as shown in the drawing, the ear 19 of each stamping overlies the outer face of the ear 18 on the other stamping, so that each pair of ears will be forced together and against the bracket 26 when the bolt 25 is tightened.

When the device is to be used, the bracket 26 is secured in position on the vehicle, and the remaining parts of the device are assembled as above described and secured to the bracket by the bolt 25. After the mirror has been adjusted to the desired position, the bolts 22 and 25 are tightened. The mirror-supporting arm will be prevented from rotating by the bolt 22, which passes diametrically through it. Lost-motion between the arm and the sleeve 21 will be taken up as a result of the distortion of the tube 12 which occurs when the bolt 22 is tightened to force the washers 23 and 24 against the sides of the tube. Displacement of the arms about the axis of the bolt 22 will be prevented by friction between the washers and the stamping-webs 15, while friction between the ears 18—19 and the bracket 26 will hold the arm in fixed position about the axis of the bolt 25.

While it is preferable, for the reasons indicated above, that the two stampings A and B be similar in form it is not essential that they be identical in all respects. Thus, if it is deemed desirable, as indicated in the drawing, to employ a carriage bolt as the bolt 22, one of the stampings, shown as the stamping B, may be provided with a square hole for the reception of the square portion of the bolt-shank while the other stamping is provided with a round hole to receive the round portion of the bolt-shank. It is desirable that the washers 23 and 24 be free to rotate relatively to the bolt 22; and accordingly, if the bolt is a carriage bolt one of the washers, shown as the washer 24, is provided with a central hole large enough to receive the squared portion of the bolt-shank and to permit the washer to rotate relatively to the bolt.

We claim as our invention:

1. In a rear-view mirror support, an arm adapted at its outer end for attachment to a mirror and of tubular cross-section at its inner end, a sleeve having a lateral opening, the inner end of said arm extending through said opening and transversely across the interior of said sleeve, washers disposed within said sleeve and on opposite sides of said arm, each of said washers being thick enough to project beyond the end of said sleeve when in contact with said arm, a pair of members overlying said washers, said members, washers, and arm being provided with alined openings, a bolt passing through said alined openings, and means for supporting said members from a vehicle, the diameter of the lateral opening in said sleeve in the plane perpendicular to said bolt being approximately equal to the diameter of the tubular end of said arm, whereby tightening of the bolt will distort the cross-sectional shape of the arm and take up lost motion between it and the sleeve in such plane.

2. In a rear-view mirror support, an arm adapted at its outer end for attachment to a mirror, and provided at its inner end with a hub having parallel end faces, a housing associated with said hub, said housing comprising a pair of members having webs respectively overlying the end faces of said hub and provided with alined openings coaxial with said hub, a bolt extending through said openings and said hub to clamp said webs in firm engagement with the end faces of the hub, said webs being provided with flanges extending toward each other to enclose said hub, said flanges being provided with opposed notches forming a slot through which said arm extends and permitting angular adjustment of said arm about the axis of said bolt, and means for mounting said housing on a vehicle.

3. The invention set forth in claim 2 with the addition that each of said housing members is provided with a pair of ears disposed in spaced planes parallel to the axis of said bolt, the ears of one housing member respectively overlying the ears of the other housing member, said ears being provided with alined openings, said mounting means including a bracket and a bolt passing through the bracket and the holes in the ears.

4. In a rear-view mirror support, an arm adapted at its outer end for attachment to a mirror, and provided at its inner end with a hub having parallel end faces, a housing associated with said hub, said housing comprising a pair of members overlying the ends of said hub and provided with alined holes coaxial with the hub, a clamp bolt extending through said openings and hub, each of said members being provided with a pair of ears located in spaced planes parallel to the axis of said bolt, the respective distances between the bolt axis and the planes of the two ears differing by an amount substantially equal to the thickness of each ear, the ears of one member respectively overlying the ears of the other member, a bracket for attachment to a vehicle, and a bolt extending through said ears and said bracket.

5. In a rear-view mirror support, an arm adapted at its outer end for attachment to a mirror, a housing having substantially parallel side walls between which the inner end of said arm is located, a filler interposed between each of said parallel walls and said arm, a pivot bolt extending through said parallel walls, said fillers, and said arm and adapted when tightened to clamp said fillers and arm between said walls and thereby hold the arm in a fixed position of angular adjustment about the axis of said bolt when the bolt is tightened, and means for attaching said housing to a vehicle.

6. The invention set forth in claim 5 with the addition that the inner end of said arm is tubular in cross-section, and means for supporting the tubular inner end of the arm in a plane perpendicular to the axis of said bolt to limit the extent to which it can collapse under the forces exerted upon it by said fillers when said bolt is tightened.

QUINTIN G. NOBLITT.
EDMUND LUDLOW.